Oct. 19, 1954           D. H. RANSOM ET AL            2,692,366
                         MAGNETIC SPEED REGULATOR
Filed Jan. 30, 1951
                                                  2 Sheets-Sheet 2

David H. Ransom
Fred Benjamin
  INVENTORS

BY Philip G. Hilbert
     ATTORNEY

Patented Oct. 19, 1954

2,692,366

UNITED STATES PATENT OFFICE 2,692,366

MAGNETIC SPEED REGULATOR

David H. Ransom, Pines Lake, and Fred Benjamin, Fair Lawn, N. J., assignors, by mesne assignments, to Reconstruction Finance Corporation, New York, N. Y., a corporation of the United States Application January 30, 1951, Serial No. 208,554

7 Claims. (Cl. 322—32)

This invention relates to magnetic voltage and speed regulators for motor generator sets.

An object of this invention is to provide motor generator systems with improved magnetic amplifier means for regulating the speed of the motor under conditions of variation in load and variation in the motor input voltage.

A further object of this invention is to provide in a motor generator system, improved magnetic amplifier means, such amplifier means having optimum operational characteristics at a predetermined frequency, together with means for regulating the speed of the motor to maintain such frequency.

Yet a further object of this invention is to provide in a system of the character described, improved means for sensing fluctuations in motor speed through deviations in the frequency of the generator output and using such deviations to vary the output of reactor means in circuit with a portion of the excitation system of the motor, thereby automatically controlling the speed of the motor and the frequency of the generator output.

Yet another object of this invention is to provide a motor generator set having a speed regulator including reactor means responsive to frequency changes in the generator output, for supplying motor excitation current, the motor excitation system including a shunt field and an auxiliary field arranged in opposed relation thereto, the reactor means being connected in circuit with the auxiliary field whereby a failure in output supplied to the auxiliary field will avoid a run away condition in the motor.

Still a further object of this invention is to provide in a system of the character described, an anti-hunt transformer in circuit with the motor and reactor means for dampening frequency changes and thereby preventing unwarranted oscillations in the system.

Still a further object of this invention is to provide in a system of the character described, a resistance in circuit with the motor shunt field for weakening the field when the motor is started and the generator field is in open circuit, together with switch means for automatically shunting the resistance when the generator field is energized under automatically controlled conditions.

Yet another object of this invention is to provide in a motor generator set, speed control means which is compact, requires no maintenance or replacement of parts, is rugged, and is efficient under varying conditions of operation.

Other objects of this invention will in part be

The invention accordingly consists in the combination of elements and interconnections therefor, which will be exemplified in the system hereinafter described, and of which the scope of invention will be indicated in the claims following.

Figure 1:
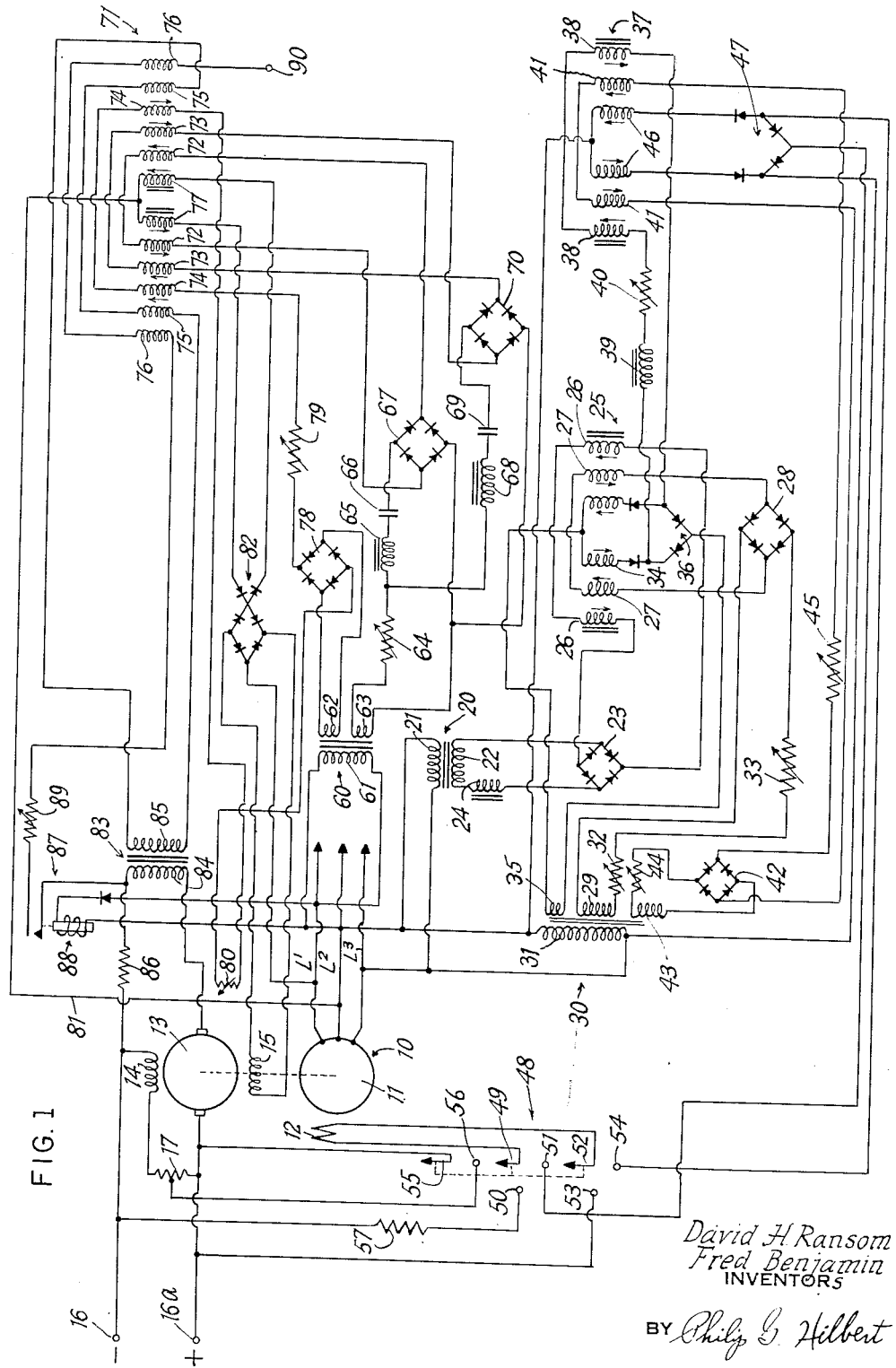
Fig. 1 is a circuit diagram of a motor generator set and speed and voltage controls therefor.
Figure 2:
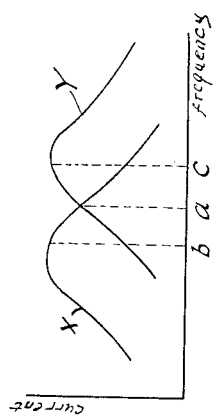
Fig. 2 is a coordinate diagram referring to the speed control portion thereof.

Referring in detail to the drawing and particularly to Fig. 1, 10 designates a polyphase alternating current generator having an armature 11 and a field 12. Such generator is used to drive a direct current motor 13 having a shunt field 14 and an auxiliary field 15. The field 15 is arranged in opposed or bucking relation to field 14 for the purpose hereinafter appearing. Current for motor 13 may be supplied from terminals 16, 16a of a suitable source of direct current which may have a voltage range in which the maximum value may be as much as twice the minimum value and which may vary continuously between such minimum and maximum values. A resistor 17 is connected in series with shunt field 14, for the purpose hereinafter appearing.

Means is provided for automatically regulating the voltage of the generator output as distributed to power lines $L_1$, $L_2$, $L_3$. Such means includes a voltage detection system which comprises a transformer 20 having a primary winding 21 connected across lines $L_2$, $L_3$, and a secondary winding 22 connected to the input side of a bridge rectifier 23, through a non-linear voltage sensing reactor 24. The reactor 24 is adapted to produce a substantial change in the current supplied to rectifier 23 in response to a relatively small change in voltage across phases of the generator output.

The output of rectifier 23 is supplied to reactor means 25 forming a first of two stages of amplification. The reactor means 25 comprises a pair of series connected control windings 26 disposed on a suitable magnetic core and connected in circuit with the output of rectifier 23. The reactor means 25 further comprises a pair of series connected bias windings 27 also disposed on said core and connected in circuit with the output side of a full wave rectifier 28. The input for rectifier 28 is supplied from a secondary winding 29 on a transformer 30. The primary winding 31 on transformer 30 is connected across lines $L_2$, $L_3$. Series connected resistors 32 provide a flux in aiding relation to that of said reactor output.

3. Speed regulating means as in claim 2, wherein said reactor means includes a bias winding, and means for controllably energizing said bias winding.

4. Speed regulating means as in claim 2, wherein said reactor means includes a third control winding, a transformer having a winding in series circuit with the armature of said motor and a winding in circuit with said third control winding whereby to damp frequency changes.

5. Speed regulating means for a mechanically coupled motor generator set wherein said motor comprises a shunt field and an auxiliary field in opposed relation thereto, means in circuit with said auxiliary field for automatically regulating the frequency of the set, a resistor in series circuit with said shunt field, a source of continuously varying voltage for energizing the armature of said motor and the shunt field thereof, means in circuit with the field of said generator for automatically regulating the generator output voltage and switch means operative to momentarily connect the generator field with said voltage source and to thereafter connect the generator field with said last mentioned regulating means and to substantially eliminate said resistor from the shunt field circuit.

6. A speed regulator for a mechanically coupled motor generator set wherein the motor includes a shunt field and an auxiliary field in opposed relation thereto, including a frequency sensing transformer having an input connected to the output of said generator, a tuned circuit including a series connected reactor means and capacitor having its input connected to the output of said transformer, a second tuned circuit including a series connected reactor means and capacitor having its input connected to the output of said transformer, saturable reactor means having an output in circuit with said auxiliary field and a pair of control windings connected in circuit with the outputs of said tuned circuits respectively, said tuned circuits being operative in response to a change in generator output frequency from a predetermined value to supply currents to the respective control windings whereby the output of said saturable reactor means is modified to vary the excitation current supplied to said auxiliary field to compensate for said frequency change.

7. In a mechanically coupled motor generator set wherein the motor includes a shunt field and an auxiliary field in opposed relation thereto, means for regulating the speed of said motor comprising saturable reactor means having an input in circuit with the generator output, an output in circuit with said auxiliary field and control means responsive to frequency changes in the generator output for regulating the output of said reactor means.

References Cited in the file of this patent

UNITED STATES PATENTS

| Number | Name | Date |
| --- | --- | --- |
| 2,286,102 | Peters | June 9, 1942 |
| 2,333,540 | Lynn | Nov. 2, 1943 |
| 2,447,644 | Frisch | Aug. 24, 1948 |
| 2,496,730 | Lindbeck et al. | Feb. 7, 1950 |
| 2,521,639 | Lauricella et al. | Sept. 5, 1950 |
| 2,524,166 | Gartner | Oct. 3, 1950 |
| 2,531,727 | Emerson | Nov. 28, 1950 |
| 2,567,476 | Hamilton | Sept. 11, 1951 |
| 2,576,646 | Sikorra | Nov. 27, 1951 |

Oct. 19, 1954　　N. S. MOORE, JR　　2,692,370
OPTICAL SYSTEM FOR OSCILLOGRAPHS
Filed June 27, 1950
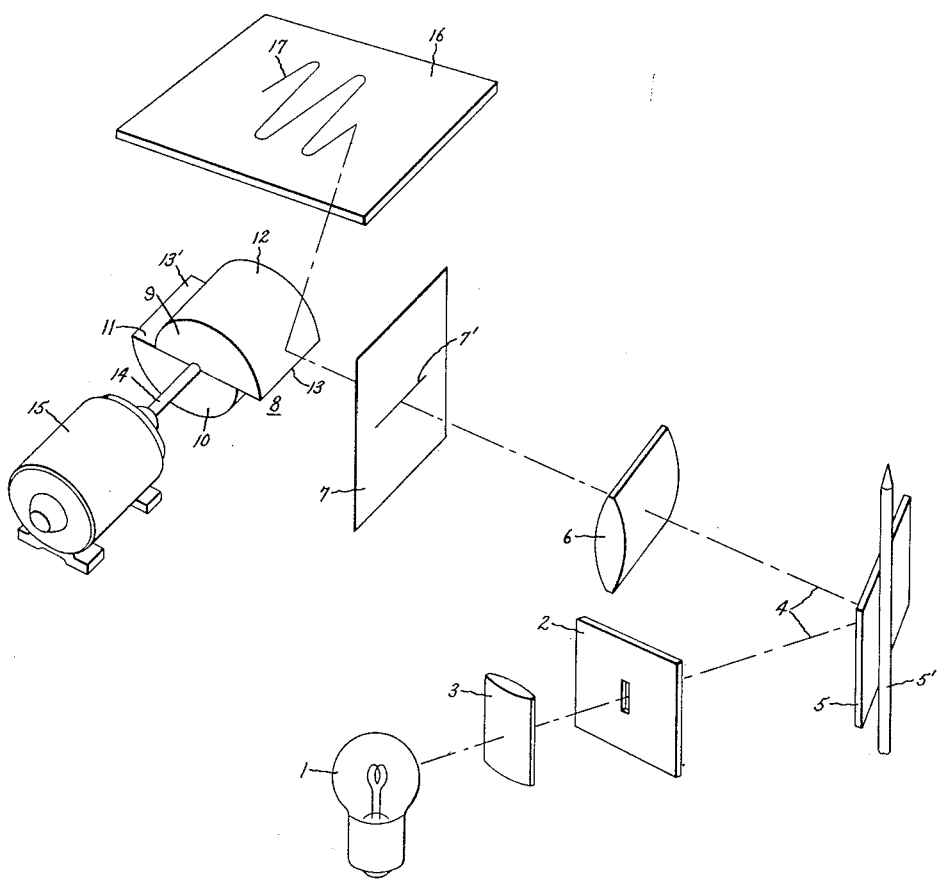
Inventor:
Nathaniel S. Moore, Jr.,
by Paul A. Frank
His Attorney.